Jan. 30, 1945.                C. K. BUELL                 2,368,110
                    HYDROCARBON CONVERSION PROCESS
                        Filed April 17, 1941
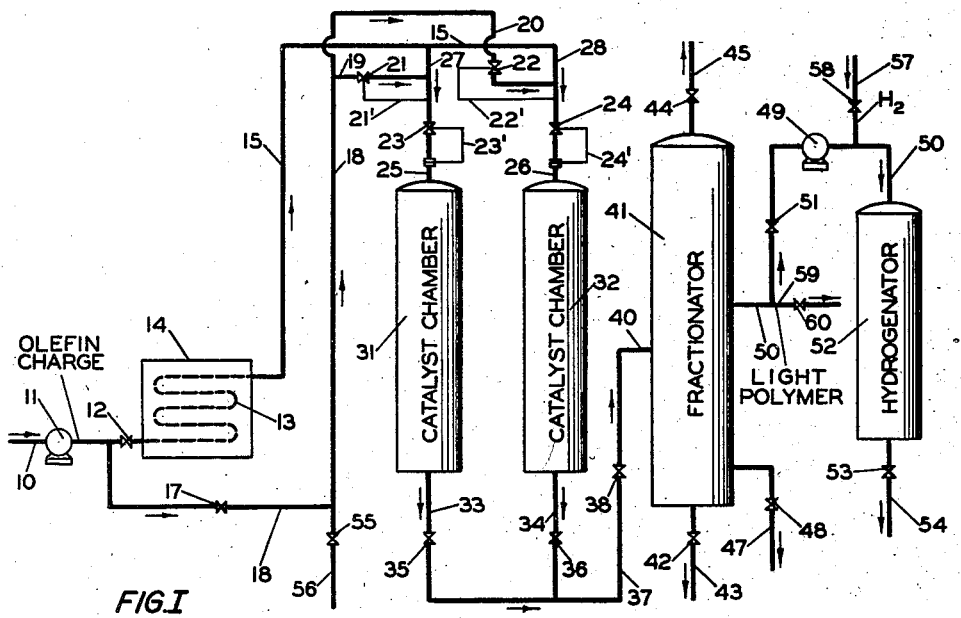
FIG.I
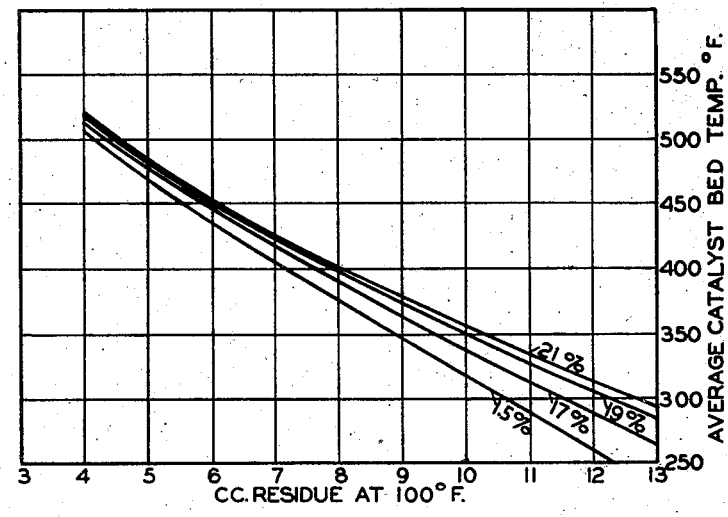
VARIATION OF RESIDUE WITH AVERAGE CATALYST BED TEMPERATURE
            FOR 91 OCTANE LIGHT POLYMER
FIG.II
INVENTOR
CHARLES KEITH BUELL
BY
Hudson, Young, Shanley + Yinger
ATTORNEY Patented Jan. 30, 1945

2,368,110

UNITED STATES PATENT OFFICE 2,368,110

HYDROCARBON CONVERSION PROCESSES

Charles K. Buell, Phillips, Tex., assignor to Phillips Petroleum Company, a corporation of Delaware Application April 17, 1941, Serial No. 389,061

11 Claims. (Cl. 260—683.15)

This invention relates to catalytic synthesis of hydrocarbons boiling within the motor fuel range from hydrocarbons boiling outside of this range. More specifically the invention relates to a catalytic process carried out under controlled conditions involving the polymerization of normally gaseous olefin hydrocarbons to hydrocarbons boiling in and above the motor fuel range.

A number of methods are in use today for the production of liquid hydrocarbon motor fuels such as gasoline, and of motor fuel stocks, by subjecting higher boiling hydrocarbons to decomposition temperature. In all of these methods a more or less large amount of normally gaseous hydrocarbons of varying composition is produced. Many processes have been proposed for converting these gaseous hydrocarbons to additional liquid hydrocarbon motor fuels, the selected process depending upon the composition of the gases converted. For example, if paraffinic hydrocarbons are the predominating material comprising these gaseous hydrocarbon compositions, motor fuel can be produced therefrom by unitary thermal conversion processes, or a multistage process employing a dehydrogenation step as a first part of the process followed by a conversion of the material produced. Other processes for converting gaseous hydrocarbons are dependent upon having olefin hydrocarbons present in relatively large proportions in the charge stock such as in well-known thermal polymerization processes and catalytic polymerization processes for producing motor fuel. Still other methods, however, have been proposed for converting refinery gases containing unsaturated components into normally liquid hydrocarbons. One of these is a modified polymerization process wherein paraffinic hydrocarbons and olefinic hydrocarbons are charged to a reactor containing a catalytic material and the paraffins and olefins are caused to interact, or as it is generally stated, the paraffins are alkylated by the olefins to form paraffins having higher molecular weights. To one skilled in the art it will be appreciated that my invention will find application in certain of these alkylation processes also.

The invention, in a restricted sense, pertains to and finds particular application in those processes wherein hydrocarbons of relatively low molecular weight are catalytically treated under suitable conditions to produce higher molecular weight hydrocarbons boiling in and/or above the motor fuel range. This invention especially pertains to such hydrocarbon conversion processes wherein a solid catalytic material promotes the conversion.

The improvement which constitutes my invention will be described in connection with a catalytic polymerization process, although I do not wish the invention to be limited in its application to this embodiment alone since it can be applied to other processes as is herein discussed. However, it will find greatest application in catalytic polymerization processes for the conversion of normally gaseous unsaturated hydrocarbons to hydrocarbons of higher molecular weight and especially for the conversion of hydrocarbon mixtures comprising different species of normally gaseous olefinic hydrocarbons to normally liquid hydrocarbons in the presence of a solid polymerization catalyst such as a silica-alumina polymerization catalyst. The product obtained by the polymerization of normally gaseous olefinic hydrocarbons comprises unsaturated polymeric hydrocarbon material which is designated as total polymer and which often contains polymeric hydrocarbon material boiling above the motor fuel range. That fraction of the total polymer which upon nondestructive hydrogenation boils within the motor fuel range is designated as light polymer. That polymer fraction which boils above the motor fuel range is heavy polymer. Light polymer which is substantially completely hydrogenated is termed hydrogenated light polymer. Motor fuel base polymer refers to any hydrocarbon polymeric material which upon nondestructive hydrogenation will yield a substantially saturated hydrocarbon material boiling in the motor fuel range. Motor fuel base stock refers to motor fuel base polymer and/or substantially saturated hydrocarbon material boiling in the motor fuel range which may be blended with other compounds or used as such for motor fuel.

Heretofore, catalytic polymerization reactions have been conducted in a variety of ways. For instance, in order to obtain a profitable amount of conversion of olefin hydrocarbons by a given body of solid catalytic material, a general existing practice is to pass a feed stock containing the olefinic material to a polymerization catalyst and to increase progressively the temperature of the catalyst bed as the catalyst ages in order to compensate for the loss in activity suffered by the catalyst. The temperature of the catalyst bed is increased in such a manner as to keep the extent of conversion of olefin hydrocarbons per pass (that is, yield of polymeric product per pass) at substantially a constant value throughout the life of the catalyst. This method is generally referred to as the "Constant conversion method."

It has been found that, when the charge stock to such a constant conversion process contains more than one olefin hydrocarbon, the octane number of the hydrogenated light polymer progressively obtained decreases as the polymerization catalyst ages. That is, the octane number of the hydrogenated light polymer varies from a high value, when the total polymer is obtained under low polymerization temperature conditions and the light polymer is separated and hydrogenated, to a low value, when the total polymer is obtained under relatively high polymerization temperature conditions and the light polymer is separated and hydrogenated. When it is desired to obtain a product of a given octane number, such a process is operated so that the spent polymerization catalyst material is removed from service at that stage of catalyst age at which the octane number of all of the hydrogenated light polymer, when blended together, has the desired or predetermined value. Under these conditions the pressure in the catalyst chamber, the flow rate through the catalyst chamber, the per cent of olefin in the feed stream and the composition of the olefin fraction of the feed stream are maintained substantially constant along with the aforementioned extent of conversion throughout the life of the catalyst, or at least vary only within a somewhat limited range, while the temperature prevailing during the catalytic conversion is increased as the catalyst declines in activity.

In other methods of operating a catalytic polymerization process wherein the catalyst is a solid material, the temperature in the catalyst chamber is maintained substantially constant throughout the life of the catalyst along with the pressure in the catalyst chamber, the flow rate through the catalyst chamber, the per cent of olefin in the feed stream and the composition of the olefin fraction of the feed. This method of operating is termed the "Constant temperature method." By this method, with the same charge stock and catalyst as is used for conversion according to the constant conversion method, the extent of conversion of the olefins in the feed and the octane number of the hydrogenated light polymer ultimately obtained vary inversely throughout the polymerization process. As the catalyst ages or as the catalyst decreases in activity the extent of conversion of the olefins per pass decreases and the octane number of the hydrogenated light polymer increases. When a catalytic polymerization process is operated in this manner, the catalyst is removed from service when the extent of conversion of the olefins reaches a predetermined minimum value below which continued operation would be uneconomical as a result of increase in processing costs. This value is often reached when only between 25 and 30 per cent of the olefins in a feed stream are converted per pass through a catalyst chamber. At this point in the constant temperature method of operation the octane number of the hydrogenated light polymer rises very slowly for each succeeding decrease in extent of conversion.

The hydrogenated light polymer produced by such polymerization methods (constant conversion and constant temperature methods) is often used as a motor fuel base stock, rather than as a finished motor fuel. When it has a high octane number it is quite valuable in producing such premium motor fuels as 100 octane number aviation gasoline. To produce such a premium gasoline it is necessary to blend this base stock with other stocks, such as with isopentane. Generally also a third stock of intermediate volatility is needed. This may be a straight-run, volatile naphtha of high octane number, a synthetic fraction such as neohexane, or some other suitable material. To produce satisfactorily a finished product, it is desirable that all the stocks have substantially constant and consistent characteristics, so that blending can be carried out continuously, or so that successive batches can be made up with substantially the same proportions. In order to accomplish this, when using a synthesis process such as one of those just described, which process produces a product of constantly varying characteristics, it is necessary either to blend in small batches or to build up storage of large amounts until a large bulk of such stored material has composite characteristics similar to those desired.

An object of this invention is to produce hydrocarbons boiling in the motor fuel range.

Another object of this invention is to produce increased yields of hydrocarbons boiling in the motor fuel range by employing a novel method for operating existing hydrocarbon conversion processes.

A further object of this invention is to convert low boiling olefins into higher boiling hydrocarbons.

Another object of this invention is to provide a novel method for operating a catalytic hydrocarbon conversion process whereby the life of the catalytic material employed in the process is lengthened.

A further object of this invention is to provide a novel method for operating a catalytic polymerization process whereby large yields of product are produced and catalyst life is materially lengthened.

Still another object of this invention is to produce from a given conversion stock a normally liquid motor fuel base stock having selected, predetermined octane number and/or other physical constants or chemical properties characteristic of motor fuel base stocks.

Other objects and advantages will be found in the disclosure presented herewith.

I have discovered that it is possible to polymerize continuously and for long periods of time a mixture of low-boiling olefins in the presence of a solid catalyst that tends to decrease progressively in activity with use in such manner that the light polymer fraction of the total polymeric product, when hydrogenated, has a constant octane number. I have found that it is possible to polymerize continuously according to my improved process such an olefin mixture to produce polymers boiling in the motor fuel range which, when hydrogenated, have substantially the same octane numbers at the start as at the end of the operation, despite the continued and progressive decrease in catalyst activity and changes in other variables of the process. That is, I have found that it is possible to control the process of polymerizing low-boiling olefins to motor fuel base stock so as to compensate for the progressively declining activity of the catalyst with use without changing the general characteristics of the motor fuel base stock so that on hydrogenation of such motor fuel base stock the octane number of the product obtained at any point during the operation of my process will have a predetermined or preselected constant octane number. During the continuous operation of my process, which may be referred to as the constant octane number method, the actual composition of the light polymer fraction of the total polymeric product may change but such light polymeric fraction, as obtained at any point during operation of my process, will on hydrogenation have the desired predetermined octane number.

This is more readily understandable when it is appreciated that there are 68 possible structural isomers of $C_8$ olefins which, upon hydrogenation, could be converted to 18 possible structural isomers of $C_8$ paraffins which have widely different octane numbers. Thus, although in the continued operation of my process one and then another of these octenes may be produced in greater preponderance, because of changes made to compensate for declining catalyst activity, nonetheless the hydrogenated product, which is the desired product, has the desired octane number.

I have further found that when a catalytic polymerization process is operated in accordance with the present invention, not only is a polymeric material of desired characteristics produced, but that the total amount of polymer of desired characteristics which is produced by a given amount of catalyst is greater than would be produced by operating according to constant temperature or constant conversion methods. I have also found that the amount of total polymeric material produced from a given quantity of charge stock and the amount of the desired polymer fraction of said total polymeric material may be increased within the most useful period of the life of the catalyst by operating according to my invention.

According to my invention, the constant octane number polymerization process is conducted so as to obtain a polymeric product which on hydrogenation yields a saturated hydrocarbon of predetermined high octane rating. In this respect, it is to be noted that when operating according to the constant conversion method, the octane number of the hydrogenated light polymer product gradually declines as the catalyst ages; the higher the conversion rate during the useful life of the catalyst the lower will be the octane number, on hydrogenation, of the cumulative polymer produced during the useful life of the catalyst. On the other hand, when operating according to the constant temperature method, as would be expected from results with the constant conversion method, the conversion rate decreases as activity of the catalyst declines, but since the catalyst becomes somewhat less active and polymerization conditions are milder, the octane number of the hydrogenated light polymer increases. When, in the constant temperature method of operation a higher temperature level is adopted, the conversion rate to polymeric product is higher and declines as the catalyst decreases in activity. The octane number at these high conversion rates is generally lower at all times than is obtained at low conversion temperature levels. The effect of variations of conversion temperature on yields of polymers and on octane numbers of the hydrogenated light polymers is shown in Boultbee, Patent No. 2,171,207, for example, and in the Comparison example hereinafter.

The process of my invention, in which the polymerization conditions are controlled or adjusted to give continuously a polymeric product comprising a light polymer fraction which on hydrogenation has a predetermined octane number, may be generally described as comprising the adjustment of the conversion temperature to such a value that the desired product results and thereafter, as catalyst activity declines, increasing the temperature to compensate for this declining catalyst activity while permitting a decrease in the yield of total polymeric product and/or the light polymer fraction thereof so that at all times the light polymer fraction of the total polymeric product has the same predetermined octane number. This process differs from the constant conversion method in that the temperature is increased at a much slower rate with respect to the declining catalyst activity, that is, to maintain constant conversion the temperature increments are made at a much faster rate or much greater temperature increments are made than in the constant octane number method of this invention. The process also differs from the constant temperature method in that the decrease in conversion rate occurs at a much slower rate than ordinarily results in operation according to the constant temperature method.

It was unexpected, when operating according to this constant octane number method, to discover that declining activity of the catalyst could be compensated for in a regular and uniform manner by increasing the conversion temperature periodically by small increments at a rate much less than would be required to maintain constant conversion conditions. The octane number of the hydrogenated light polymer in constant conversion methods of operation definitely decreases as the temperature is increased to compensate for decreased catalyst activity. When the temperature of conversion is maintained constant, the yield of polymer decreases and octane number increases as the catalytic activity declines. It could not be predicted, since the products obtained at different temperatures and at different conversion rates are obviously different, that the regular progressive increase in temperature and decrease in polymer yield as catalyst activity progressively declined, would result in the production of products which, when hydrogenated, had the same octane numbers. This is probably attributable to the fact that although the unhydrogenated light polymer fraction at different times during the process may vary in its content of various isomeric unsaturated polymers, nonetheless, when hydrogenated, a saturated light polymer fraction at one time during the process has substantially the same octane number as a saturated polymer fraction obtained at another time during the process.

It is impossible to operate in a continuous manner according to the constant conversion method with a catalyst of progressively decreasing activity so as to obtain products which do not vary in octane number when hydrogenated. It is also impossible to operate the constant temperature method in a continuous manner so as to obtain products which when hydrogenated have the same octane numbers. In my constant octane number method both the temperature and the conversion rate are varied, the variation of conversion rate being made by means of temperature variations, but such temperature variations are made at a slower rate than would normally be required to maintain constant conversion conditions.

In its broadest aspects, my invention can be applied in those catalytic hydrocarbon conversion processes for the production of hydrocarbons boiling within the range of desired motor fuel from charge stock comprising hydrocarbons boiling outside of this range. Thus, in some instances, those processes conducted in the presence of catalysts for the production of hydrocarbons boiling in the motor fuel range from hydrocarbons boiling above this range can be operated according to my invention. However, as has been mentioned hereinbefore, the invention will find greatest application in catalytic polymerization processes conducted in the presence of solid catalytic material.

In the accompanying drawing:

Figure I is a flow-diagram illustrating diagrammatically an arrangement of apparatus by which a specific embodiment of the invention may be applied to polymerization of olefins.

Figure II is a chart which may be used as a guide in conducting a polymerization process in accordance with my invention.

With reference to Figure I, in one method of conducting the process of my invention, the feed comprising polymerizable olefins enters the system through inlet 10 and pump 11, which maintains it at any desired pressure. It is divided into two substreams, one of which is heated to a desired temperature in heating coil 13 in heater 14, and the other of which passes unheated, or only partially heated, through conduit 18. The temperature to which the first substream is heated is generally at least as high as the maximum temperature desired for the charge stock to the polymerization step in the presence of the least active catalyst body that is to be used in the subsequent polymerization chambers; in addition, the temperature should be high enough to compensate for any heat loss occurring prior to the polymerization. A temperature of 450 to 600° F. is suitable for most purposes, but it may be higher or lower than this range of temperatures in particular instances. The temperature is preferably maintained at a substantially constant level by means of an automatic temperature controller, not shown, that regulates the input of heat or of fuel to heater 14.

Although generally coil 13 is so constructed that the pressure drop in it and conduit 15, taken together, is greater than that in conduit 18, at times it may be desirable to increase the resistance to flow of the heated substream. Such an increase may be readily effected by constricting this substream, as by control-valve 12 or by a constriction in conduit 15.

The hot substream passes from heater 14 through conduit and manifold 15, from which lead branch pipes 27 and 28. The cooler substream passes through valve 17 and conduit and manifold 18 from which lead branch pipes 19 and 20. Branch pipes 27 and 28 are joined to 19 and 20, respectively, and from their junctures pipes 25 and 26 lead to catalyst chambers 31 and 32, respectively. The rates of flow through pipes 25 and 26 are preferably controlled by flow-control valves 23 and 24, respectively, and are generally held substantially constant for long periods of time, often throughout the life of the catalyst body in chambers 31 and 32. This flow control is adapted to set a predetermined value on the total flow, more than sufficient material being available to supply this value. In some instances the maximum capacity of any one of the pipes 25 and 26 may be a sufficient limit so that no additional control such as valves 23 or 24, is necessary. In most cases, however, it will be desirable at times not to reach the capacity of the pipe carrying the combined streams as a maximum and for this reason some sort of flow-control, as shown, will be used. These flow-control valves may be manually or otherwise operated, as desired, but very satisfactory operation is obtained by having them automatically controlled through the agency of means activated by an orifice flow meter, or other type of flow meter, represented by 23' and 24' respectively. The individual regulating means may both be set to the same flow rate, or to different flow rates, as individual circumstances may indicate is desirable or necessary. The temperatures of the composite streams flowing through each of the pipes 25 and 26 are regulated by flow-control valves 21 and 22 in branch pipes 19 and 20, respectively, which convey the cooler material. These valves may be manually or otherwise operated, as desired, but I have obtained good performance by having them actuated by temperature responsive devices or means which respond to the temperatures of the composite streams in conduits 25 and 26 as represented by 21' and 22', respectively. With this arrangement, a slight positive differential is maintained in manifold 18 over that in manifold 15, thereby insuring a positive flow through the control valves 21 and 22 at all times. The temperature responsive devices should be placed at a sufficient distance from the union of the hot and cooler streams to result in accurate control, such as at a sufficient distance to insure effective mixing of the streams. Other means for accomplishing the same result may be used, but for most applications this arrangement is the simplest. A number of automatic controllers, or similar means are available commercially, and can be readily adapted by one skilled in the art. Such may be set to any desired temperature or temperatures for the composite streams, and will then operate the flow-control valves 21 and 22 to maintain such temperatures. Such temperature values may be changed from time to time as desired, either by hand or automatically as hereinafter described.

In catalyst chambers 31 and 32, polymerization of olefins to heavier hydrocarbons is effected in the presence of a suitable polymerization catalyst, not shown. Each catalyst chamber generally contains a different portion or body of the same catalytic material, and in general at any particular moment the different bodies of catalyst have different degrees of activity, and hence require different temperatures, all other conditions being the same, for the production from each chamber of polymers which, on hydrogenation, have substantially the same octane number and/or other physical and chemical characteristics. With this particular modification these different temperatures are obtained by suitable control of valves 21 and 22. As the catalyst body in any particular catalyst chamber becomes progressively deactivated, the amount of unsaturated hydrocarbons converted per pass and the catalyst bed temperature, the latter being dependent for the most part on the temperature of the incoming reactant stream, must be changed according to predetermined established relationships so as to produce a material which upon hydrogenation will have a constant octane number at all stages of polymerization catalyst life. The temperature is usually increased and this may be effected by a manual setting of the corresponding automatic controller actuating the appropriate valve of the valves 21 or 22 so that less unheated material passes through the valve controlled by the automatic controller, thereby effecting an increase in the temperature of the charge to the catalyst body and also increasing the extent of olefin polymerization so that a predetermined change in the amount of unsaturates converted per pass can be realized. Alternatively, the setting of such an automatic controller may be changed by a secondary automatic controller (not shown) that is actuated, directly, or indirectly, by some characteristic of the effluent streams in the appropriate conduits 33 and 34 and so setting or controlling the primary controllers 21' and 22' that the temperature in the reactant stream is adjusted to that required to produce a polymeric hydrocarbon material having constant predetermined characteristics, either physical or chemical or both, throughout the life of the polymerization catalyst. Since sufficient material is available to maintain the maximum flow through any one of the pipes 25 and 26 at all times, a decrease in the amount of cooler stream automatically results in an increase in the amount of hotter stream, with an accompanying increase in temperature of the composite stream without changing the total flow rate. The converse may be also readily obtained.

The substream 18 has been primarily described as an unheated stream but it may be heated to a certain extent as by the heat of compression produced by pump 11. However, it is preferably not heated above the minimum temperature to be employed for any particular reactant stream. The catalysts chambers are not, in this modification, heated otherwise than by the reactant streams. The chambers are insulated against excessive heat loss and that heat loss which occurs is more than compensated by exothermic heat of polymerization, which in addition causes the temperature of the effluent to be about 30 to 90° F. above that of the incoming reactant stream measured in conduits 25 and 26. Although I have found it desirable to operate as particularly described, it will be appreciated that other polymerization chambers which have other means for controlling the temperature of the catalyst bed may be used without departing from the spirit of the invention.

As the catalyst in any one chamber loses activity, the temperature at which that chamber operates is changed so as to maintain the octane number, after hydrogenation, of a light polymer fraction, at a constant value. This temperature change is preferably carried out in accordance with a chart such as is shown in Figure II, which is prepared as discussed hereinafter and which is a representative chart for the guidance of an operator in operating a process according to my invention, in this instance to produce a polymer which will yield a hydrogenated light polymer of 91 octane number. The curves on Fig. II labeled 15 per cent, 17 per cent, 19 per cent, and 21 per cent represent the percentage of unsaturates in the charge stock normally encountered during plant operation. The percentage of unsaturates does not appreciably vary throughout a single day's operation, but over an extended period of time, such as several days or two or three weeks, may range from about 15 to about 21 per cent depending on factors outside the operator's control. In order to use Fig. II, the percentage of unsaturates in the charge stock, the average catalyst bed temperature and the residue must be considered. The cc. of residue is obtained by weathering at 100° F., a given amount of a representative sample of the total effluent of the catalyst chamber, and is indicative of the total polymer present in this effluent. When a fresh catalyst is put into service, its activity is high and the desired conversion of olefins into polymer will be obtained at a low temperature. Also, the higher the initial activity of a catalyst, the lower will be the temperature at which the desired initial conversion rate may be effected. When a fresh catalyst is first put into service, the temperature of the catalyst bed is slowly raised until the residue obtained by the weathering test and the average catalyst bed temperature define a point on the particular curve that represents the current value of unsaturates in the charge stock. Thus, assuming that the feed stock contains 17 per cent unsaturates, this point may be, for example, 11.5 cc. residue and 300° F. Now assuming that the unsaturate content of the feed stock does not change, as the catalyst ages, or fails in activity, this failure will be evidenced by a decrease in residue. When this decrease is detected, the temperature of the catalyst bed is raised a few degrees so that the residue value and temperature again define a point on the 17% unsaturates curve. This process is repeated so that the point defining the temperature and residue value moves along the curve as the catalyst fails until the amount polymerized (residue value) has decreased until it is no longer economical to keep the catalyst in service. Thus, with a fresh catalyst being operated at a low temperature on a charge containing, for example, 19% olefins, as will be discussed hereinafter, a high residue will give a hydrogenated light polymer having a desired octane number, while as the catalyst becomes deactivated and a higher temperature becomes necessary for satisfactory operation, the temperature and amount of residue are to be correlated to define a point on the 19% line, the charge remaining the same. Should the olefin content of the charge change at the same time, for example to 17%, the temperature and amount of residue are to be correlated to define a point on the 17% line.

After the polymerization has been effected in catalyst chambers 31 and 32 the streams of products pass through gate valves 35 and 36, respectively, and are combined. The resulting composite effluent stream passes through control valve 38, which serves as a pressure reduction valve, and conduit 40 to fractionator 41 in which fractionation is effected into any desired number of fractions, in this case four fractions. One of these fractions contains light polymer or polymer which upon non-destructive hydrogenation will produce substantially saturated hydrocarbons boiling in the motor fuel range. Another fraction comprises substantially heavy polymers comprising hydrocarbons boiling above the motor fuel range, which are removed through valve 48 and conduit 47. A light fraction is also obtained which comprises substantially relatively light or unreacted hydrocarbons, which may be withdrawn from the system through valve 44 and outlet 45. A fourth fraction comprises a tarry residue product, if one is formed, which may be withdrawn through valve 42 and outlet 43 at the bottom of the fractionator.

The heavy polymer fraction, removed through conduit 47, may be treated in whole or in part to increase the yield of motor fuel base polymer as by depolymerization. The light fraction, removed through conduit 45 will be substantially paraffinic, and may also be treated in whole or in part to increase the yield of olefins as by dehydrogenation, and then reprocessed. The light polymer fraction is removed from fractionator 41 through conduit 50 controlled by valve 51, and is passed through pump 49 to hydrogenation chamber 52, together with a stream of material containing free hydrogen, the latter being admitted, under suitable pressure, to conduit 50 through conduit 57 controlled by valve 58. Hydrogenation chamber 52 contains a catalyst which will promote the catalytic non-destructive hydrogenation of substantially all of the light polymer fraction from unit 41 under suitable conditions of reaction time, temperature, pressure and flow rate. A substantially completely saturated product is removed from chamber 52 through conduit 54 controlled by valve 53 and is designated in this specification as hydrogenated light polymer. This hydrogenated light polymer will give substantially a constant, predetermined octane number throughout the operation of the process with any given solid polymerization catalyst contained in chambers 31 and 32 when the process is carried out in accordance with the improvement which constitutes my invention.

The operation of the fractionator 41 is preferably such that the light polymer fraction will be constantly within a desired, predetermined boiling range, such as a fraction containing all the C₅ and heavier hydrocarbons and having an end point of about 430° F. In some instances the entire polymer fraction may be used, in which case no material will be recovered through conduits 43 or 47. When it is desired to use the polymer fraction without hydrogenation, it may be recovered from the process through conduit 59, controlled by valve 60 and leading from conduit 50.

It will be readily appreciated that Figure I of the drawing is diagrammatic and in the nature of a flow sheet, in which many pieces of conventional equipment are not shown. Additional pumps, heaters, coolers, meters, flow controllers, temperature indicating and controlling equipment, reflux equipment, and the like, may be included and supplied by one skilled in the art in connection with any specific modification or installation, in the light of the detailed description of material flows, reaction conditions, fractions desired, and material streams to be separated which are disclosed herein.

Example I is given purely for the purpose of illustrating a mode of operation of my invention, and the advantages which are afforded by its use; it is not necessarily to be taken as establishing any limitations of the invention.

EXAMPLE I

A liquid butane-butene feed stock was pumped to a pressure of about 1500 pounds per square inch; its temperature was about 100° F. Part of this feed under pressure was passed through a suitable heater and its temperature was raised to about 600° F. The other part of the feed stream under pressure was not heated. The feed stock contained about 81.2 mol per cent butanes and about 18.8 mol per cent olefins, the latter comprising essentially a mixture of isobutene and normal butenes. Both the heated and unheated streams were charged to a silica-alumina catalyst contained in a catalyst chamber through the automatic controls as described hereinabove in connection with Figure I of the drawing and as more fully discussed in the application of K. H. Hachmuth, Serial No. 333,872, filed May 7, 1940. An olefinic portion of the feed stock was converted into polymers. The effluent from the catalyst chamber, which comprised total polymer and unreacted feed stock, was then passed to a fractionator in which a separation was made into three fractions comprising a light polymer, or motor fuel base polymer of about 60° A. P. I. which represented the major portion of the total polymer and comprised that fraction of the total polymer boiling below about 390° F., a heavy polymer fraction of about 44° A. P. I., and a fraction comprising butane and unreacted olefins. The light polymer fraction was non-destructively hydrogenated to a substantially saturated motor fuel base stock referred to as hydrogenated light polymer.

The pressure in the catalyst chamber and the quantity of olefins in the feed stock were maintained substantially constant throughout the life of the catalyst. The flow rate of feed stock through the catalyst chamber was maintained between the limits of 5 and 20 volumes per volume of catalyst per hour and the isobutene content was maintained between 20 and 33 per cent of the total amount of polymerizable olefins. The temperature of the silica-alumina catalyst bed and the amount of olefins converted per pass of charge stock through the catalyst bed were so correlated that the octane number of the hydrogenated light polymer was a substantially constant value of 91 at all times during the conversion and throughout the life of the catalyst. At the beginning of the conversion the average temperature of the catalyst bed was about 300° F. and about 71 per cent of the olefins in the feed stream were converted per pass into polymeric material. The light polymer from this material after non-destructive hydrogenation had an octane number of 91. The average temperature of the catalyst bed on removal of the catalyst was about 470° F. and the amount of olefins converted per pass had declined to about 31 per cent. The octane number of the hydrogenated light polymer obtained, however, was still about 91. Samples of this hydrogenated product removed from the process throughout the conversion also had a substantially constant octane number of 91.

In plant operation, from which data for this example and others cited herein were obtained, control samples were obtained at intervals of about two hours, and during an extended period of operation the octane number of the hydrogenated light polymer at any time during its production did not deviate from the desired value by more than about ±1 octane number. By exercising somewhat more precise control, such as by collecting and analyzing control samples at shorter intervals of plant operation than two hours and/or by employing a charge stock of relatively more constant composition, it is possible to produce a hydrogenated light polymer having an octane number at any time during its production which does not deviate more than about ±0.5 octane number from the desired value. However, under other conditions, where the composition or other characteristics of the charge varies uncontrollably so that such precise control of the operating conditions is more difficult, the polymerization step can still be operated in the light of the present disclosure to give improved results, although variations from time to time of the octane number may be somewhat greater than has been indicated. Optimum limits for such variations, and maximum possible variations which will still give desirable results under conditions which may have to be empirically accepted, can be readily determined by one skilled in the art for any particular application of my invention, in the light of the present disclosure.

The silica-alumina polymerization catalyst used in this run was a solid granular material comprising a major portion of silica and a minor portion of aluminum in the form of aluminum oxide similar to that described in McKinney Patent No. 2,142,324.

Data pertinent to the catalyst life and light polymer yield of this run are recorded in column 1, Table I. In Table I are also recorded data on a comparison run (details described in the Comparison example hereinafter) conducted by the constant conversion method referred to hereinbefore.

Table I

|  | 1 Example I Constant octane number method | 2 Comparison example constant conversion method | 3 Per cent increase |
|---|---|---|---|
| Pounds of catalyst charge to catalyst chamber [1] | 2,268 | 2,394 |  |
| Total barrels of feed stock charged to chamber | 30,361 | 22,358 |  |
| Temperature at which catalyst was removed from service °F | 470 | 470 |  |
| Mol per cent total unsaturates (isobutene + n-butene) in feed stock | 18.8 | 18.8 |  |
| Mol per cent isobutene in feed stock | 5.0 | 4.9 |  |
| Barrels of total polymer produced | 1,701 | 1,098 |  |
| Total barrels charge per pound catalyst | 13.4 | 9.3 | 44.1 |
| Gallons of total polymer per pound catalyst | 31.5 | 19.3 | 63.2 |
| Volume yield light polymer per volume isobutene | 1.034 | 0.916 | 12.9 |
| Volume yield light polymer per volume unsaturates | 0.276 | 0.262 | 5.3 |

[1] The catalysts used in both examples were of equal initial activity.

In order to contrast results obtained by operating a polymerization process according to my invention with older methods of operating, such as the constant conversion method, the Comparison example is presented which illustrates the latter method under conditions which simulate insofar as is possible those employed in the run illustrated by Example I.

COMPARISON EXAMPLE (CONSTANT CONVERSION METHOD)

A butane-butene feed stock similar in composition to the feed stock described in Example I was passed to a catalyst chamber containing a silica-alumina catalyst having a composition and initial activity similar to the catalyst described in Example I and through control equipment also similar to that described in Example I. Furthermore, the conditions of pressure within the catalyst chamber, the quantity of olefins in the feed stock and the composition of the olefin fraction of the feed and the temperature of the catalyst bed on removal of the catalyst from service were the same as those in Example I. Variables comprising the conditions of pressure within the catalyst chamber, the flow rate of feed stock through the catalyst chamber and the temperature of the catalyst bed on removal of the catalyst from service were optima for cooperating with a predetermined, optimum, constant depth of conversion of about 47 per cent to yield an amount of total polymer such that a maximum amount of light polymer was obtained, which had an overall final composite octane number of 91.0 after non-destructive hydrogenation. During conversion the octane numbers of various samples of this hydrogenated light polymer ranged between about 97 and 82 at different periods of the life of the polymerization catalyst. Data pertinent to the catalyst life and light polymer yield of this run is recorded in column 2 of Table I.

By inspecting Table I it is readily apparent that the increase in catalyst life afforded by the constant octane number method of operation according to the present invention is 63.2 per cent over the constant conversion method since the yield of total polymer per unit of catalyst has been found to be proportional to or a measure of catalyst life. Furthermore, the data in Table I show that the constant octane number method of operation results in a 5.3 per cent increase in the amount of light polymer produced per unit of total unsaturates in the feed and a 12.9 per cent increase in the amount of light polymer produced per unit of isobutene and a 44.1 per cent increase in the amount of charge stock processed per unit of catalyst over those obtained by the constant conversion method.

The constant conversion method of operation has disadvantages other than those disclosed by Table I when compared to the constant octane number method. The latter method of operating a polymerization process wherein a mixture of olefins comprises a feed stock to a solid polymerization catalyst is a simplified method of operation. As a hydrogenated light polymer of constant octane number and/or other physical and chemical characteristics is produced at all stages of catalyst life, storage facilities for octane number blending and/or other purposes are not required. Furthermore, savings are effected, since the labor involved in product transfers and the more numerous control tests of the constant conversion method are decreased by operating according to the method taught by the disclosure of the present specification.

EXAMPLE II

In Table II there are tabulated some of the characteristics of a hydrogenated light polymer product obtained by the constant octane number method. This product had a substantially constant octane number of 89 at all stages of catalyst life and throughout the conversion. The charge stock to the polymerization catalyst contained substantially similar amounts of olefins but the isobutene content varied from 16 to 28 per cent of the olefin content during the period of time that samples 241, 64 and 219 were collected. However, I have found that the constant octane number method of operating, controlled according to charts such as shown in Figure II, is only slightly affected by a change in the isobutene content of the stock as long as it is within the range of 16 and 33 per cent of the olefin content. It is readily seen from Table II that in operating a polymerization process to produce hydrogenated light polymer of substantially constant octane number throughout the conversion, the temperature of the polymerization catalyst bed and the amount of olefins converted are changed accordingly.

For comparison, Table II also contains data showing some characteristics of a hydrogenated light polymer obtained by the constant conversion method. The hydrogenated light polymer product from this method of conversion had an initial octane number of 95.6 when produced from a polymerization catalyst bed operated at 236° F. This value dropped to 87.8 when the catalyst bed temperature was increased to 501° F. in order to maintain the extent of conversion substantially constant throughout the life of the catalyst. The total composite product had an overall octane number of about 91.

chart relates only to the production of a light polymer, which after hydrogenation has 91 octane number and an end point of about 390° F., in the presence of solid polymerization catalysts and particularly silica-alumina and "silica-alumina type" catalysts as described: The charge stocks employed in constructing the chart of Figure II were such that the unsaturates content comprised substantially butenes and isobutene wherein the ratio of isobutene to normal butenes ranged between 1:4 and 1:2. Also, the flow rates of such

Table II

| Method of operation | Polymerization conditions | | | | | Inspection data of hydrogenated light polymer | | | | | | | | | |
|---|---|---|---|---|---|---|---|---|---|---|---|---|---|---|---|
| | Sample number | Catalyst bed temperature | Total olefin content | Iso-butene per cent of total olefins | Per cent of olefin converted | Octane No. | Gravity °A.P.I. | A. S. T. M. distillation D86-40 Evaporated temperatures | | | | | | | |
| | | | | | | | | I. B. P. | 10% | 30% | 50% | 70% | 90% | E. P. |
| | | °F. | | | | | | | | | | | | |
| Constant octane number method. | 241 | 376 | 15.1 | 16 | 63.3 | 89.2 | 64.6 | 164 | 217 | 230 | 238 | 250 | 335 | 393 |
| | 64 | 435 | 15.4 | 26 | 44.0 | 89.7 | 64.8 | 194 | 224 | 230 | 234 | 242 | 278 | 380 |
| | 219 | 512 | 15.2 | 28 | 38.8 | 88.6 | 65.8 | 153 | 217 | 230 | 234 | 241 | 277 | 380 |
| Constant conversion method. | 100 | 236 | 14.7 | 22 | 38.4 | 95.6 | 65.8 | 178 | 213 | 222 | 234 | 253 | 349 | 380 |
| | 135 | 319 | 14.2 | 27 | 43.1 | 95.0 | 64.9 | 189 | 220 | 229 | 237 | 251 | 346 | 384 |
| | 154 | 355 | 16.4 | 26 | 44.8 | 93.4 | 65.3 | 165 | 219 | 228 | 235 | 246 | 340 | 384 |
| | 173 | 400 | 14.6 | 27 | 45.2 | 91.9 | 65.1 | 208 | 223 | 229 | 235 | 242 | 298 | 380 |
| | 189 | 501 | 14.7 | 23 | 40.7 | 87.8 | 65.7 | 120 | 208 | 228 | 236 | 244 | 302 | 385 |

Other catalysts, similar to the catalyst used in the runs illustrated by the above examples, may be employed in my invention. Some of these comprise a major portion of silica and a minor portion, not more than 10 per cent and generally between 0.5 and 5.0 per cent by weight, of aluminum in the form of aluminum oxide. In the preparation of the preferred form of such a catalyst an acid silica hydrogel is first prepared and before it is thoroughly dried or dehydrated it is treated or activated with an aqueous solution of an aluminum salt, such as a solution of aluminum chloride, sulfate or nitrate. In this manner a part of the aluminum from the solution is selectively adsorbed by the hydrous silica, presumably in the form of a hydrous oxide or loose hydroxide compound and it is not removed by subsequent washing. This selective adsorption is attested by a decrease in the aluminum content of the activating solution as well as a decrease in the pH of the solution as the activation progresses. After activation, the material is washed until the wash water is substantially free of the anion of the salt of the activating solution, and it is then dried.

Various catalysts of this nature but differing among themselves as to one or more specific properties may be prepared by activating a hydrous silica gel with an aqueous solution of a hydrolyzable salt of some other metal, especially one selected from group III-B or from group IV-A of the periodic system, instead of with a solution of an aluminum salt. More particularly a salt of indium, thallium, titanium, zirconium, beryllium or thorium may be used to activate the silica gel and thereby to prepare catalysts of this same general type. Boron in the form of boric acid or a soluble borate such as sodium borate may also be incorporated with silica gel of a suitable pH to form a silica boron oxide catalyst. All these catalysts in general can be termed synthetic gel catalysts and in particular will be referred to as "silica-alumina type" catalysts. Other solid polymerization catalysts, such as the "solid" phosphoric acid catalysts, various metal phosphates, alkali haloaluminates, and the like may also be employed.

Referring again to Figure II, this particular charge stocks to catalyst beds were maintained within the range of 5 to 20 volumes of feed, measured at 60° F. per hour per volume of catalyst. Within this range of flow rates the total unsaturates content of the feeds were restricted to between 13 and 23 per cent. Although, in using the chart a change in flow rate of the charge will necessitate a change in other operating conditions to maintain constant octane number conversion, the chart can be satisfactorily employed for any and all flow rates which are substantially within this range.

A chart such as is shown in Figure II may be prepared in any one of several ways, all of which are, of course, based on actual operating data. A convenient and simple method for preparing any one of the lines, such as the 17% line, is to record data obtained when using a body of catalyst with a charge having a constant composition of 17% butenes and a relatively constant ratio of isobutene to normal butenes and a relatively constant flow rate. Upon varying the temperatures at various stages of catalyst activity, there is determined the amount of polymerization resulting, as may be indicated by the volume of residue obtained upon weathering a standard sample of the total effluent and also the octane number, after hydrogenation, of a specific light polymer fraction. From these determinations it will be seen that at each of several temperatures a certain extent of conversion has produced a polymer, the light fraction of which after hydrogenation had a certain octane number, in this case 91. These particular data, when plotted, will define a line corresponding to the 17% line of Figure II. When it is desired to produce a different constant octane number, for example, 88, other of the total data so obtained will define a similar line which may be used to produce from the same charge a polymer, the light fraction of which after hydrogenation will have consistently an octane number of 88. Similar procedures are followed for other charge stocks and other desired octane numbers.

In order to use the chart of Figure II and similar charts, only the percentage of unsaturates in the feed stock, the residue from the weathering test, and the average temperature throughout a catalyst bed need be considered in order to produce a desired product. In using Figure II the restrictions and limitations hereinbefore mentioned in connection with Figure II must be met. Assuming then that the charge stock in question contains 17 per cent unsaturates, the average catalyst bed temperature and the residue after the weathering test procedure must be so correlated that when plotted as a point on the chart of Figure II, the point will fall on the curve designated by the legend "17%." The general method for employing similar charts in operating a hydrocarbon conversion process is to follow the curve corresponding to the current value of unsaturates in the feed stock and so adjust the catalyst bed temperature that the residue obtained and the catalyst bed temperature meet on that curve. By following this procedure for operating a polymerization process throughout the life of the polymerization catalyst, the octane number of the motor fuel base made by the reaction will be satisfactorily near the desired value.

The octane number values referred to throughout the specification are those obtained by the A. S. T. M. Method, D357–40. Other methods of evaluating octane numbers may, of course, be employed. When the motor fuel base produced by the reaction is an unsaturated polymeric hydrocarbon material, said material is first substantially non-destructively hydrogenated to such a point that tests show that it contains less than 1 per cent unsaturates. The octane number is then determined on the hydrogenated product. However, when it is not desired, or it is unnecessary, to produce a saturated product, a test is satisfactorily or more conveniently made on an unhydrogenated fraction. In some cases a total polymer fraction, rather than only a part thereof, may be used.

Charts similar to Figure II can be prepared for feed stocks containing a wide variety of polymerizable hydrocarbons other than isobutene and normal butenes and for wide ranges of concentrations. For example, my invention is readily adapted to polymerization processes wherein mixtures containing two or more normally gaseous polymerizable hydrocarbons are subjected to silica-alumina or "silica-alumina type" catalysts as previously disclosed. These mixtures may comprise two or more olefins selected from the group comprising propylene, 1-butene, 2-butene, isobutene, and any of the pentenes. Olefins of even higher boiling points than the pentenes may be employed in my process, although they are often not as desirable as lower boiling olefins, being readily usable as such as motor fuel. Ethylene may also comprise one of the polymerizable olefins, although often it will not be found to be satisfactorily converted. These olefins can be converted to inter-, cross-, and co-polymers having predetermined characteristics at any period of production and throughout the life of the catalyst. The predetermined characteristics referred to do not only include the octane number of the hydrogenated light polymer obtainable therefrom but may also include such characteristics as the 90 per cent distillation point of the polymer itself or of the hydrogenated polymer or a combination of the 90 per cent and 50 per cent distillation points, said distillation points being determined according to the A. S. T. M. designation, D86–40. Also, the predetermined characteristics may comprise substantially any one or more which identify the product, other than those mentioned.

Furthermore, as has been hereinbefore stated, my invention can be applied to the modified catalytic polymerization process, generally known as alkylation, especially when a solid alkylation catalyst is employed. The invention is especially applicable to alkylation processes wherein a paraffin is alkylated by olefin hydrocarbon reactants comprising two or more species of olefins selected from the group consisting of ethylene, propylene, 1-butene, 2-butene, isobutene, pentenes and hexenes and/or wherein more than one species of a paraffin hydrocarbon and especially low-boiling isoparaffin hydrocarbons are alkylated by any one of the olefins in the above list in the presence of one or more solid alkylation catalysts. My invention can also be applied to the alkylation of paraffins with alcohols and alkyl halides in the presence of solid alkylation catalysts under suitable alkylation conditions when more than one species of paraffins and/or alcohols and/or alkyl halides are present in the mixture, the alcohols or alkyl halides then being considered the equivalents of olefins.

The range of octane number within which a product can be produced will be to a certain exten dependent upon the constituents of the charge stock. Thus, in the polymerization of olefins to produce a polymer fraction which is subsequently hydrogenated, a charge stock which contains propylene and normal butenes will produce a product the octane number of which can be varied within a range which will generally be lower than if the charge stock contains isobutene and normal butenes, although the two ranges may overlap. Likewise, a charge stock containing a high ratio of isobutene to normal butenes can be treated to produce a product having a constant octane number higher than if this ratio is lower, and vice versa. In general, to produce a hydrogenated light polymer from the more usual olefin-containing charge stocks, the polymerization step is preferably so operated to yield such a product having an octane number which is constant and within a range of about 70 to 100 octane number, more preferably about 85 to 95. Substantially the same range holds for the alkylation of isobutane and/or isopentane with a similar olefin-containing charge. In producing a motor fuel stock from catalytic cracking, there will be a somewhat analogous dependence upon the characteristics of the charge, especially upon whether it is predominantly paraffinic, olefinic, or aromatic, and in many instances a product will be recovered directly from the effluent without a hydrogenation, or like subsequent treating step. In polymerizing olefins to form motor fuel stocks, charge stocks within wide ranges of olefin content may be employed. For olefin-olefin polymerization, olefin contents lower than about 10 per cent generally can not be economically employed. While charge stocks approaching 100 per cent olefin content may be used, the use of such high concentrations is attended with heat-exchange and over-polymerization difficulties, and practical operations will generally be carried out with an olefin content of the charge between about 15 and 50 per cent. Olefin contents at about 10 per cent and less are, of course, desirable for charge to catalytic alkylation systems.

Although the operating pressure for conducting the catalytic polymerization discussed in Example I was about 1500 pounds per square inch, the operating pressure for conducting polymerization reactions to which this invention applies may range from about 100 to 5000 pounds per square inch, or more, although I prefer to operate in liquid phase, or in a correspondingly dense phase when above the critical temperature of the mixture being treated. For this, pressures of about 500 to 1500 or 2000 pounds per square inch are generally satisfactory.

Many modifications of my invention are possible and can be applied without going outside the spirit of the invention, which is not to be necessarily nor unduly restricted by the examples. Optimum operating conditions for any particular case may be readily determined by trial by one skilled in the art, in the light of the disclosure.

I claim:

1. In a catalytic conversion process for the production of a hydrocarbon fraction having a boiling range within the motor fuel boiling range from a hydrocarbon charge stock having a boiling range outside of said range and in which is used a solid catalyst which progressively declines in activity with use, the improvement which comprises progressively increasing the temperature of conversion of the hydrocarbon charge stock while permitting progressive decrease in the extent of conversion as the catalyst progressively declines in activity so that the octane numbers of substantially identical fractions of hydrogen-saturated converted hydrocarbon charge stock having a boiling range within the motor fuel boiling range, at substantially all times during the conversion, do not vary substantially and are substantially identical predetermined octane numbers.

2. In a catalytic conversion process for the production of a hydrocarbon fraction having a boiling range within the motor fuel boiling range from a charge stock containing hydrocarbons having boiling points lower than the desired motor fuel boiling range and in which is used a solid catalyst which progressively declines in activity with use, the improvement which comprises progressively increasing the temperature of conversion of the charge stock while permitting progressive decrease in the extent of conversion as the catalyst progressively declines in activity so that the octane numbers of substantially identical fractions of the converted charge stock having a boiling range within the motor fuel boiling range, on hydrogenation, at substantially all times during the conversion, do not vary substantially and are substantially identical predetermined octane numbers.

3. In a catalytic conversion process for the production of a hydrocarbon fraction having a boiling range within the motor fuel boiling range from a hydrocarbon charge stock having a boiling range outside of said range and in which is used a solid catalyst which progressively declines in activity with use, the improvement which comprises progressively increasing the temperature of conversion of the hydrocarbon charge stock while permitting progressive decrease in the extent of conversion as the catalyst progressively declines in activity so that the octane numbers of substantially identical fractions of the converted hydrocarbon charge stock having a boiling range within the motor fuel boiling range, on hydrogenation, at substantially all times during the conversion, do not vary substantially and are substantially identical predetermined octane numbers.

4. In a catalytic conversion process for the production of a hydrocarbon fraction having a boiling range within the motor fuel boiling range from a hydrocarbon charge stock having a boiling range outside of said range and in which is used a solid catalyst which progressively declines in activity with use, the improvement which comprises progressively increasing the temperature of conversion of the charge stock at a slower rate than would be required to maintain conditions conforming to constant conversion operation while permitting progressive decrease in the extent of conversion at a slower rate than would result from maintenance of conditions conforming to constant temperature operation as the catalyst progressively declines in activity so that the octane numbers of substantially identical fractions of the converted hydrocarbon charge stock having a boiling range within the motor fuel boiling range, on hydrogenation, at substantially all times during the conversion, do not vary substantially and are substantially identical predetermined octane numbers.

5. In a catalytic process for the polymerization of normally gaseous olefin hydrocarbons to a normally liquid hydrocarbon fraction having a boiling range within the motor fuel boiling range in the presence of a solid polymerization catalyst which progressively declines in activity with use, the improvement which comprises progressively increasing the temperature of polymerization of the charge stock while permitting progressive decrease in the extent of polymerization as the catalyst progressively declines in activity so that the octane numbers of substantially identical fractions of the polymerized product having a boiling range within the motor fuel boiling range, on hydrogenation, at substantially all times during the conversion, do not vary substantially and are substantially identical predetermined octane numbers.

6. In a catalytic process for the polymerization of a normally gaseous olefin hydrocarbon mixture comprising isobutene and normal butenes to a normally liquid hydrocarbon fraction having a boiling range within the motor fuel boiling range in the presence of a silica-alumina polymerization catalyst, the improvement which comprises progressively increasing the temperature of polymerization of the charge stock while permitting progressive decrease in the extent of polymerization as the catalyst progressively declines in activity so that the octane numbers of substantially identical fractions of the polymerized product having a boiling range within the motor fuel boiling range, on hydrogenation, at substantially all times during the conversion, do not vary substantially and are substantially identical predetermined octane numbers.

7. In a catalytic conversion process for the production of a hydrocarbon fraction having a boiling range within the motor fuel boiling range from a charge stock comprising hydrocarbons having boiling points outside of said range and in which is used a solid catalyst which progressively declines in activity with use, the improvement which comprises progressively increasing the temperature of conversion of the charge stock while permitting progressive decrease in the extent of conversion as the catalyst progressively declines in activity so that the octane numbers of substantially identical liquid hydrocarbon fractions having a boiling range below a predetermined fixed temperature in the desired motor fuel range and containing all the normally liquid hydrocarbons produced and having boiling points below said predetermined fixed temperature, on hydrogenation, at substantially all times during the conversion, do not vary substantially and are substantially identical predetermined octane numbers.

8. In a catalytic process for the alkylation of a paraffin hydrocarbon with an olefin hydrocarbon to produce a normally liquid hydrocarbon fraction having a boiling range within the motor fuel boiling range in the presence of a solid alkylation catalyst which progressively declines in activity with use, the improvement which comprises progressively increasing the temperature of alkylation of the charge stock while permitting progressive decrease in the alkylation rate as the catalyst progressively declines in activity so that the octane numbers of substantially identical fractions of the alkylation product having a boiling range within the motor fuel boiling range, at substantially all times during the conversion, do not vary substantially and are substantially identical predetermined octane numbers.

9. In a process for the production of a motor fuel which comprises the catalytic polymerization of normally gaseous olefines in the presence of a solid catalyst which progressively declines in activity with use, segregation of a light polymer fraction having a predetermined end point from the total polymeric product, and hydrogenation of said liquid polymer fraction, the improvement in the catalytic polymerization whereby a motor fuel of predetermined octane number results, which comprises progressively increasing the temperature of polymerization of the charge stock while permitting progressive decrease in the extent of polymerization as the catalyst progressively declines in activity so that the octane numbers of light polymer fractions having the predetermined end point, on hydrogenation, at substantially all times during the conversion, do not vary substantially and are substantially identical predetermined octane numbers.

10. In a process for the production of a saturated motor fuel stock from a mixture of a plurality of low-boiling hydrocarbons containing at least two hydrocarbons which react to produce normally liquid hydrocarbons having a boiling point within the motor fuel boiling range in the presence of a solid catalyst which progressively declines in activity with use, the improvement which comprises continuously passing as charge stock a stream of said mixture of hydrocarbons through a bed of said catalyst under conversion conditions of temperature, pressure and flow rate and, as the activity of said solid catalyst declines with use, progressively increasing the effective temperature of conversion of said mixture of hydrocarbons by adjustment of the temperature of said bed of solid catalyst, the pressure, or the flow rate of the charge stock while permitting a progressive decrease in the extent of conversion as the catalyst progressively declines in activity so that the octane numbers of substantially identical fractions of the converted charge stock having a boiling range within the motor fuel boiling range, on hydrogenation, at substantially all times during the conversion, do not vary substantially and are substantially identical predetermined octane numbers.

11. A process for the continuous production of a saturated motor fuel stock from normally gaseous olefin hydrocarbons, which comprises continuously passing in liquid phase a normally gaseous hydrocarbon mixture containing at least two polymerizable olefins at a flow rate between approximately 5 and approximately 20 volumes per volume of catalyst per hour through a stationary bed of solid silica-alumina polymerization catalyst maintained at a temperature between approximately 250° F. and approximately 500° F., and, as the activity of the catalyst declines with use, progressively increasing the temperature of the catalyst bed while permitting a progressive decrease in the extent of conversion so that the octane numbers of substantially identical fractions of the converted charge stock having a boiling range within the motor fuel boiling range, on hydrogenation, at substantially all times during the conversion, do not vary substantially and are substantially identical predetermined octane numbers, passing the effluent from said catalyst to a separating means, and continuously separating therefrom a light polymer fraction containing all normally liquid hydrocarbons having boiling points below a fixed temperature in the upper part of the motor fuel distillation range and nondestructively hydrogenating said fraction to produce a saturated motor fuel stock.

CHARLES K. BUELL.